United States Patent [19]

Bendit et al.

[11] 4,326,870

[45] Apr. 27, 1982

[54] PROCESS AND DEVICE FOR FUSION JOINING OF FIBER-OPTICS FIBERS

[76] Inventors: Jean-Pierre Bendit, Vieilles Geuches, Courgenay, Switzerland, 2892; Jean-Paul Pellaux, Petits Chenes 2, Neuchatel, Switzerland, 2000; Georges Widmer, Berghausweg 21, Bienne, Switzerland, 2501

[21] Appl. No.: 186,964

[22] Filed: Sep. 15, 1980

[30] Foreign Application Priority Data

Sep. 14, 1979 [CH] Switzerland .................. 8329/79

[51] Int. Cl.³ .................................... C03B 23/20
[52] U.S. Cl. ........................... 65/4.21; 65/29; 65/152; 65/158
[58] Field of Search .......... 65/4.21, 4.2, 12, 152, 65/29, 158; 350/96.15, 96.21; 156/158

[56] References Cited

U.S. PATENT DOCUMENTS

| | | | |
|---|---|---|---|
| 3,798,099 | 3/1974 | Marcatili | 156/158 |
| 4,049,414 | 9/1977 | Smith | 65/152 X |

FOREIGN PATENT DOCUMENTS

| | | | |
|---|---|---|---|
| 52-68426 | 6/1977 | Japan | 350/96.21 |
| 601121 | 6/1978 | Switzerland . | |
| 1267788 | 3/1972 | United Kingdom | 65/4.2 |
| 1500026 | 2/1978 | United Kingdom . | |

OTHER PUBLICATIONS

Hatakeyama et al., "Fusion Splices for Optical Fibers . . .", Applied Optics, vol. 17, No. 12, Jun. 15, 1978, pp. 1959–1964.
Hatakeyama et al., "Fusion Splices for Single-Mode Optical Fibers . . .", Rev. Electrical Comm. Labs., vol. 27, Nos. 7–8, Jul.–Aug. 1979, pp. 532–542.
Bisbee, "Optical Fiber Joining Technique", The Bell System Technical Journal, vol. 50, No. 10, Dec. 1971, pp. 3153–3158.

*Primary Examiner*—Richard V. Fisher
*Attorney, Agent, or Firm*—Holman & Stern

[57] ABSTRACT

A process for fusion joining the ends of optical fibers includes aligning the ends of the two fiber cores to be joined facing each other such that at least one of the ends is free to be displaced laterally and there is no axial force between the two ends. The ends of the fibers are heated by producing a heat field with a predetermined distribution, for a predetermined period until attenuation of light transmitted through the fused joint increases, so as to cause partial fusion of the cores while maintaining sheathing of the fibers intact. A device for fusion splicing the two ends includes two opposed fiber supports for maintaining the end portions of the optical fibers to be fusion spliced in an approximately aligned position, the supports being slidable along the axes of the fibers being mounted on said supports such that their ends are free to move laterally. Optical means, such as a binocular microscope, is provided for checking whether the ends of the fibers are in the position where they engage one another without exerting any axial force on each other. A propane-oxygen flame heating device establishes a controlled distribution of heat field for heating the core ends.

5 Claims, 2 Drawing Figures

PROCESS AND DEVICE FOR FUSION JOINING OF FIBER-OPTICS FIBERS

The present invention concerns a process and a device for fusion joining of the ends of optical fibers to produce an optical junction between two aligned fibers each of which fibers comprises a glass core and a glass sheathing.

According to a known process of this type, fusion joining is accomplished at a flat cross section of the two fibers, wherein the cores and sheathings of said fibers are joined in a strictly aligned position, yielding minimal attenuation of light intensity at the junction. The ends of the two fibers are prepared for the joining by being given a flat surface perpendicular to the fiber axis. The fibers are then placed in a support device which enables the positioning of the ends which are to be joined, and the fusion joining is accomplished by applying heat to the junction location.

The source of heat used in known processes is of the nature of an electrically heated wire, an electric arc, or a plasma torch (see, e.g., the article "Fusion splices for optical fibers by discharge heating", by Iwao Hatakeyama et al., in the journal, Applied Optics, v. 17 no. 12, 15 June 1978; and also Swiss Pat. No. 601,121). An electric wire does not allow high enough temperatures to be achieved to fusion-join silica fibers; and an electric arc or a plasma arc requires a high-voltage source of electrical energy, with all the accompanying inconvenience which is unavoidable with the use of such a source, particularly when the joining must be done in the field.

Further, the known processes require very delicate support equipment to apply axial force on the fibers during the fusion joining in order to compensate for the loss of material at the surface of the junction due to the local fusion of the sheathing and of the core, which fusion is characteristic of these processes.

It is an object of the present invention to avoid the drawbacks of prior fusion joining processes, and to devise a process which permits one to dispense with high voltage electrical energy sources and with supports which require extremely precise alignment and an axial force during the fusion joining. Another object of the invention is to improve the quality of the optical junction obtained, in that the loss of light intensity at the junction is reduced, and particularly in that deviations in attenuation over a large number of junctions are reduced.

SUMMARY OF THE INVENTION

A process for fusion joining of the ends of optical fibers to produce an optical junction between two aligned fibers each of which fibers comprises a glass core and a glass sheathing; characterized in that the ends of the two fibers to be joined are disposed facing each other, with their faces cut transversely, in an approximately aligned position but such that at least one of the ends is free to be displaced laterally and there is no axial force between the two ends; and in that the ends of the fibers are heated by producing a heat field with a predetermined distribution, for a predetermined period, so as to cause partial fusion of the cores while maintaining the sheaths of the fibers intact, whereby the ends of the fibers are automatically aligned under the action of the surface tension which arises in consequence of said fusion, and whereby the fusion junction is produced automatically by solidification, at the instant when alignment is achieved, whereby the material which solidifies here is fused material which has penetrated by capillary action into the space between the cores of the fibers which are to be joined.

A process further characterized in that the ends of the fiber cores are heated by means of a flame.

A process further characterized in that the flame is a flame from a mixture of propane and oxygen.

A process further characterized in that in positioning the fibers they are displaced axially with respect to each other so that the ends which are in contact are deflected laterally, and then the fibers are displaced axially in the reverse direction until the deflection disappears.

A device for carrying out the above process characterized in that it comprises means to bring and maintain the fibers to be fusion joined in contact in an approximately aligned position such that at least one of the ends of the fibers is free to be displaced laterally; further comprises means to control the position of the fibers and the absence of axial force between said fibers; and comprises means for heating the ends of the fiber cores, including means for establishing the distribution of the heat field and means for controlling the duration of the heating.

The invention may be understood with the aid of the description of particular embodiments given below by way of example, which description is illustrated in the attached drawings.

Figure 1:
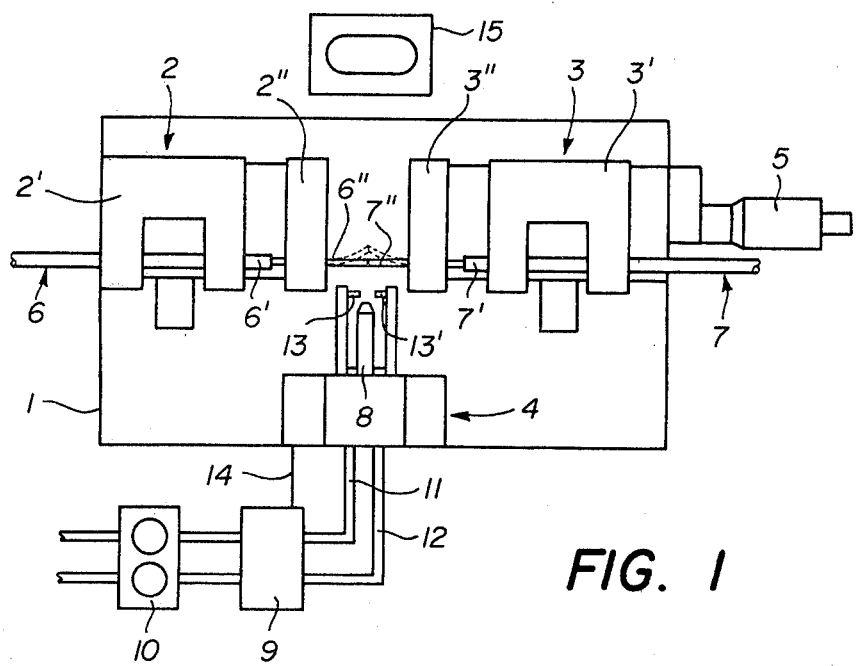
FIG. 1 is a top view (schematic) of a fusion joining device which may be used to produce a junction according to the invention.

The device represented schematically in FIG. 1 comprises a fusion joining apparatus 1 of which the essential elements are a fixed fiber support 2, a displaceable fiber support 3, and a microburner 4. The fiber supports 2 and 3 each comprise a device (2' and 3', respectively) for holding the sheathed part of the fiber, and a device (2" and 3", respectively) for holding the bared part of the fiber. These devices may be of a known type and may comprise, for example, a support plate with a V-shaped groove and a cover part which is spring loaded in order to hold the fiber by pressing it into said groove. One of the supports—here support 3—is axially displaceable with respect to the fixed fiber, said displacement being with the aid of, e.g., a micrometer screw 5.

The two fibers 6 and 7 are shown schematically on an exaggerated scale with respect to the rest of the device. The sheathed parts 6' and 7' can thereby be distinguished, as well as the bared ends 6" and 7" of the fibers, which fibers are positioned end to end in approximately aligned position. A nozzle 8 of a microburner 4 is disposed facing the junction point. The position of this nozzle is adjustable with respect to the junction which is to be produced; the adjusting mechanism is not shown. The feed to the burner of oxygen, along with, preferably, propane, is accomplished via conduits 11 and 12. Operating and flow control devices 9 and manometers 10 are inserted in the respective gas conduits for controlling the characteristics of the flame and the duration of its presence. Starting (igniting) electrodes 13 and 13' are disposed near the nozzle and are also controlled by the operating device 9, with this control arrangement being shown schematically by control link 14. Finally, a device for observing the ends of the fibers is shown schematically by 15.

In carrying out the process according to the invention, the fibers are placed in the supports 2 and 3, with the ends of the cores bared and the contact surfaces prepared in the customary manner to afford a plane surface which is perpendicular to the fiber axis.

According to one feature of the invention, the ends of the fibers are fixed so as to be laterally displaceable with respect to each other, and the parts in contact are not rigorously aligned. Also, they are positioned in such a way that they do not exert an axial force on each other during the fusion joining. A preferred method of assuring such a positioning consists of first axially displacing one of the fibers (here, fiber 7) with respect to the other fiber, to produce a lateral deflection of the ends of the fibers such as is shown in exaggerated fashion by the dotted lines in FIG. 1. One then displaces fiber 7 backward until the point where the lateral deflection disappears; this event can be monitored with adequate accuracy by means of a suitable visual observation device 15, for example a binocular microscope.

When the fibers have been positioned as described such that they are free of axial stress and are laterally displaceable, one applies burner 4, the position of the nozzle and the characteristics of the flame of which have been previously adjusted so as to produce a predetermined heat field. The heating is conducted for a period of time which is also predetermined, which time is controlled by means of device 9.

According to the invention, as shown in FIG. 1, the heat field intensity and the duration of the heating are chosen such that the core of the fiber undergoes partial fusion while the sheath of the fiber remains intact. During the fusion a small quantity of fused material penetrates by capillary action into the space between the contact surfaces of the two fibers. In addition, the local softening of the cores of the two fibers gives rise to surface tension around the junction, which tension tends to bring the two ends of the fibers into the equilibrium position, which is the aligned position. Thus, there is automatically produced an effect of alignment of the fibers. Further, at the instant when the fibers become aligned their lateral movement stops, and at that instant the film of fused material which has penetrated between the two surfaces which are in contact is solidified by absorption of the heat present, said absorption being by the nearby parts of the sheaths of the two fibers, which parts are cold.

The present process thus leads to an auto-alignment of the fibers, followed by fusion joining of the cores in which the sheaths of the fibers remain intact.

Figure 2:
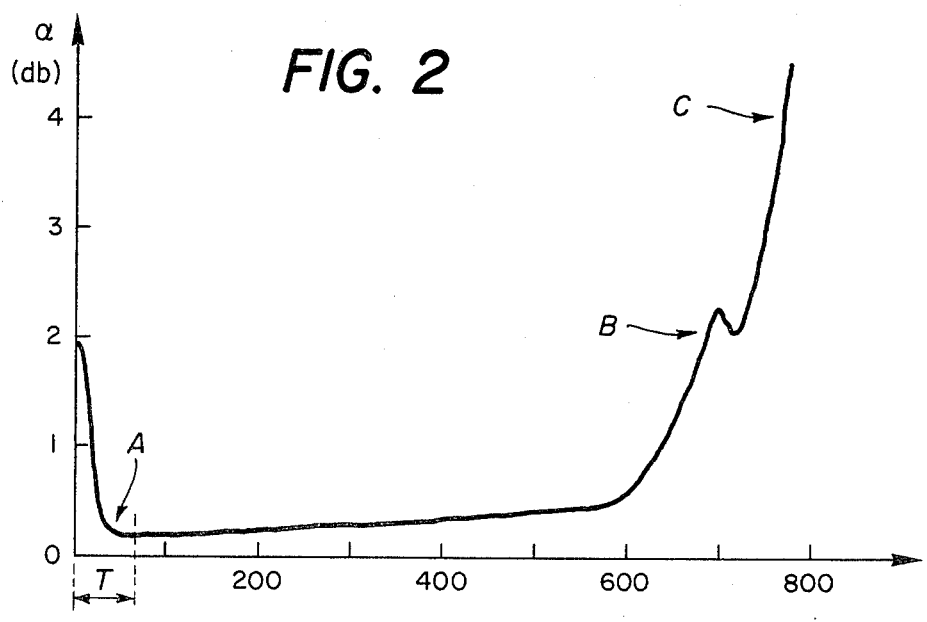
FIG. 2 is a plot showing light attenuation across a junction as a function of the temperature of heating of the junction.

FIG. 2 illustrates the effect of the duration of heating T on the attenuation alpha of light across the junction. It turns out that with an adequate heat field which produces only partial fusion of the cores of the fibers, the attenuation decreases until the point where the fibers arrive at the alignment position (region A in FIG. 2). If one continues to heat the fibers, the attenuation increases, first slowly and then rapidly, as indicated in FIG. 2 (region B); in the process the core of the fibers is being attacked. Finally, quite quickly thereafter, the fiber breaks (region C). The ideal treatment time is thus approximately equal to the time T indicated in FIG. 2, whereby the treatment is stopped after the appearance of a minimum in the attenuation. It is seen that this time is not very critical—which facilitates the choice of treatment parameters in the case of fabrication of junctions of the same type in series.

The quality of the junctions obtained by the present process has proved to be excellent: the resulting attenuation is extremely low, and the dispersion over a large number of junctions in series is very low.

In the practical application of the process the following amount to decisive advantages in favor of the present technique of joining optical fibers: absence of a source of high voltage energy, and considerable simplification of the support device both from the standpoint of its design and with regard to its use and operation.

We claim:

1. Process for fusion joining of the ends of optical fibers to produce an optical junction between two aligned fibers each of which fibers comprises a glass core and a glass sheathing; characterized in that the ends of the two fiber cores to be joined are disposed facing each other, with their faces cut transversely, in an approximately aligned position but such that at least one of the ends is free to be displaced laterally and there is no axial force between the two ends; and in that the ends of the fibers are heated in order to form a fused joint by producing a heat field with a predetermined distribution; for a predetermined period until attenuation of light transmitted through the fused joint increases, so as to cause partial fusion of the cores while maintaining the sheathing of the fibers intact, whereby the ends of the fibers are automatically aligned under the action of the surface tension which arises in consequence of said fusion, and whereby the fused joint is produced automatically by solidification, at the instant when alignment is achieved, whereby the material which solidifies here is fused material which has penetrated by capillary action into the space between the cores of the fibers which are to be joined.

2. Process according to claim 1 characterized in that the ends of the fiber cores are heated by means of a flame.

3. Process according to claim 2 characterized in that the flame is a flame from a mixture of propane and oxygen.

4. Process according to claim 1 characterized in that in positioning the fibers they are displaced axially with respect to each other so that the ends which are in contact are deflected laterally, and then the fibers are displaced axially in the reverse direction until the deflection disappears.

5. A device for fusion splicing the ends of two optical fibers at their cores, comprising two opposed fiber supports for maintaining the end portions of the optical fibers to be fusion spliced in an approximately aligned position, said supports being slidable along the axes of said fiber end portions, and means mounting the fibers on said supports such that their ends are free to move laterally; optical means for checking whether the ends of the fiber optics are in the position where they engage one another without exerting any axial force on each other; a propane-oxygen flame heating device for establishing a controlled distribution of heat field for heating the core ends of the fiber optics, and means for controlling the duration and intensity of the heating operation to fusion splice the ends of the optical fibers at their cores.

* * * * *